US005367577A

United States Patent [19]

Gotaas

[11] Patent Number: 5,367,577

[45] Date of Patent: Nov. 22, 1994

[54] OPTICAL TESTING FOR GENUINENESS OF BANK NOTES AND SIMILAR PAPER BILLS

[75] Inventor: Einar Gotaas, Oslo, Norway

[73] Assignee: Datalab Oy, Esbo, Finland

[21] Appl. No.: 838,222

[22] PCT Filed: Aug. 17, 1990

[86] PCT No.: PCT/NO90/00132

§ 371 Date: Mar. 3, 1992

§ 102(e) Date: Mar. 3, 1992

[87] PCT Pub. No.: WO91/03031

PCT Pub. Date: Mar. 7, 1991

[30] Foreign Application Priority Data

Aug. 18, 1989 [NO] Norway ............................ 893323

[51] Int. Cl.[5] ............................ G06K 9/00

[52] U.S. Cl. ............................ 382/7; 382/17

[58] Field of Search ............ 382/7, 17, 65; 209/534; 358/504, 318

[56] References Cited

U.S. PATENT DOCUMENTS

| | | | |
|---|---|---|---|
| 3,496,370 | 2/1970 | Haville et al. | 250/219 |
| 4,383,275 | 5/1983 | Sasaki et al. | 382/65 |
| 4,618,257 | 10/1986 | Bayne et al. | 382/7 |
| 4,731,663 | 3/1988 | Kovalchick et al. | 382/17 |
| 4,749,087 | 6/1988 | Buttifant | 209/534 |
| 4,947,441 | 8/1990 | Hara et al. | 382/7 |
| 5,027,415 | 6/1991 | Hara et al. | 382/7 |

FOREIGN PATENT DOCUMENTS

| | | |
|---|---|---|
| 1318185 | 5/1972 | United Kingdom . |
| 2078368 | 1/1982 | United Kingdom . |
| 2192275 | 1/1988 | United Kingdom . |

*Primary Examiner*—Yon J. Couso
*Attorney, Agent, or Firm*—Nixon & Vanderhye

[57] ABSTRACT

A method and a means for checking genuineness of paper money are based upon detection of the characteristic difference in the printing process for genuine bank notes and counterfeit bills produced with a color copying machine. The detection is conducted in narrow wavelength bands respectively in typical red and blue color ranges, and simultaneously in particular directions, with reflected and scattered light. Detection of intensity in a correspondingly narrow band near the maximum sensitivity range of the eye, i.e. in the green range, and in another direction, is also conducted for reference purposes. Preferably the measurement is made in a particularly selected point where the contents of blue and red in the print of the genuine note is at an extremum, i.e. high or low.

19 Claims, 2 Drawing Sheets

Figure 1A:
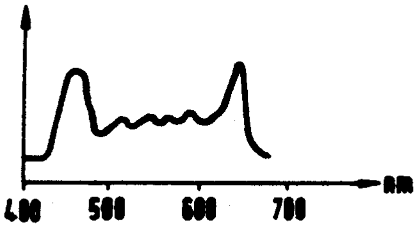

Spectral curve for ideal and real print colours.

OPTICAL TESTING FOR GENUINENESS OF BANK NOTES AND SIMILAR PAPER BILLS

The present invention concerns a method and a meals for optical testing of genuineness of bank notes, forms, cheques and similar paper bills. In particular the invention relates to recognizing paper notes on the basis of the particular optical signature of a genuine multilayer colour printed paper note, as opposed to the signature of a counterfeit note which hits been produced by means of a modern colour copying machine.

Until to-day, "good" forgeries of bank notes have been made by offset printing. It is just recently that colour copying machines have been enabled to copy bank notes with a passable result. Such modern colour copying machines are now entering the market, and banks are presented with a possibly very large problem with good colour copies of bank notes, cheques etc.

Previously a genuineness test of bank notes has usually been made by analysing embedded security parameters, like e.g. security thread and water mark. However, an automatic reading of e.g. a water mark is very difficult technically, ant also rather expensive. Thus, an authenticity test by means of these security parameters is adapted to a relatively small volume of test machines.

However, to-day quite a different volume of counterfeit bank notes is to be expected. One is in fact now confronted with a rather different type of counterfeiter than previously. "Amateurs" who to-day have access to a colour copying machine, will possibly flood the market with forged copies in a short time. Thus, it is reasonable to suppose that the largest part of counterfeit bank notes in the market in the time to come will be such copies from commercially accessable colour copying machines.

There is clearly a need of a cheap and rapid way of sorting out these colour copies. The present invention concerns a simple, cheap and above all very rapid method for sorting colour copies from genuine paper notes.

A genuine bank note is printed in a multilayer printing process, e.g. steel gravure or rotogravure. However, colour copying machines operate in a quite different manner, and they use quite different dye stuffs, with optical characteristics which are quite different from offset or steel gravure dye stuffs. The invention is intended to expose these differences in production method and dye material in the bank note printing process.

At this point it is opportune to mention briefly previously known and related optical methods:

An analysis of bank notes can of course be made by means of a scanning spectrophotometer, which exposes completely the optical signature all over the wavelength range in question, e.g. the range corresponding to visible light. Such a measuring technique, which of course is able to distinguish between colour copies and genuine bills, is quite useless in the practical case, due to the time required for testing one single bill.

However, there are numerous bank note receivers in the market to-day, which in addition to other tests also take a look at the bank note colours. But many of the methods used are limited to using only one colour. In the prior art it is usual to transport the bank note past one single colour sensor, and then the signal which appears is analysed along the length of the bill. Still, this technique works poorly, because the sensor is very sensitive to impurities and wear of the bank notes, as well as variations in the printing process of the genuine bank notes.

An improved method is disclosed in British patent application, publication no. 2,107,911, in which a bank note is scanned by a combination of two sensors respectively measuring in a green and a red colour range. The ratio between the measured intensities in red and green are formed, and the complete scanned track on the bank note is compared with a previously learned track. In this publication light emitting diodes are used as light sources, which gives a very limited choice of colours. Nor do ordinary light emitting diodes ever radiate with a constant intensity, and this means that the disclosed system has a very limited precision and stability.

Also U.S. Pat. No. 3,496,370 uses a technique where colour balance is taken into account, and in addition light transmittance and reflectance are checked in the test procedure. One or a few particular test spots are selected on basis of knowledge of the optical characteristics of a genuine bill. However, no special measures are provided to ensure that the test will be able to distinguish between two bills with the same apparent colour, but produced in two different manners as explained above. In such a case specific information regarding directional reflectivity/scattering as well as narrowband wavelength will be needed to make the correct decisions as to genuineness.

British patent application, publication no. 2,078,368 describes a system which makes a complete analysis of the complete reflected colour spectrum. Even if this system provides very good information regarding the optical signature of a bank note, it is burdened with the following obvious disadvantage: The system is very complicated and expensive. Nevertheless, this system suffers from certain technical drawbacks: For example, there is no correction of drift and aging in the photo diodes in the row of such diodes used here for reading the output from a spectroscope. Further, a very powerful light source is probably required in such a system in order to achieve an acceptable signal output level from the spectroscope. Still, the most significant differences in relation to the present invention, is that the system in accordance with GB 2,078,368 does not at all take into use direction variable colour information, and that the publication makes a summation of the deviations in colours in the complete spectrum. In a good colour copy there will be minimum colour deviation in the range 480–620 nm. Because this range is also included in the "error sum", a small but quite essential error contribution from one of the colours red or blue will therefore be suppressed in the total error sum.

As mentioned above, the present invention aims at providing a rapid and cheap, however still a reliable method of distinguishing between the colour print of genuine bank notes and the copied colour of a colour copy note. The meaning of "rapid" in this case is that the test itself is executed at a rate which is adapted to normal automatic processing speed for bank notes, e.g. faster than one millisecond. This is achieved in a method and by a means as defined in the patent claims below.

In the printing process for real or genuine bank notes, print dye stuffs are applied in many layers, i.e. often four to eight layers. The dye layers are translucent, and the colour recorded in the end by the eye, therefore is a mixture of all dye layers plus the colour of the paper on which printing is made. The colour perceived by the eye is a composition partly of reflected light from the dye layers, but also the transmission characteristics of the dye stuffs play a role in the visual perception. The light from the "lowermost" dye layers will necessarily be influenced by the transmission characteristics of the other dye layers.

By studying the colours in a spectrophotometer it is often possible to recognize the different dye elements used in the different layers.

Most bank notes will always have one or several quite typical colour extremum points in their spectrum. However, the colour print process in a copying machine is effected in a manner which deviates markedly from the rotogravure process. In the colour copying machine the colours are first analysed in the original point by point. Then the copy is formed by applying print dye stuff point by point. The copying machine has only three primary colours plus possibly black. In order to mix colours, this is effected by applying primary colour dyes in tiny points (1/100 mm), and the number of the different primary colour points determines how the eye or a sensor with poorer spacial resolution than the point size perceives the colour combination.

In this case each colour point covers the surface completely, i.e. the paper colour cannot show through. In order to provide brighter colours, the copying machine may partly select the distance between the respective tiny colour points, partly line rasters can be introduced in the printing so that the paper colour shines through the colour print.

In several ways this printing technique gives a result which can be demonstrated by means of the different methods which the present invention relates to. The invention describes a combination colour sensor looking at many optical characteristics of the print surface. A copy may be very similar to the original in several of the characteristics, but because the copying process is physically quite different from the rotogravure process, one or several characteristics will always exhibit significant deviations.

At first it should be noted that the colour reproduction presented by the copying machine is adapted to the sensitivity curve of the eye, i.e. the most important colour range is the green central range of the visible light. In the copying machine the colour analysis is effected in three colour bands.

Each one of these colour bands must have a bandwidth of about 100 nm (FIG. 1*b*) to be able to describe the complete visible spectrum.

By analysing each colour in a wide colour band, "narrow", typical and significant colour bands in the original will not be detectable for the copying machine. See FIG. 1*a*.

Figure 1B:
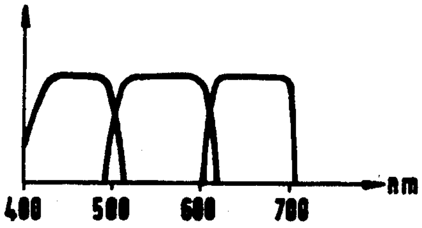
Figure 1C:
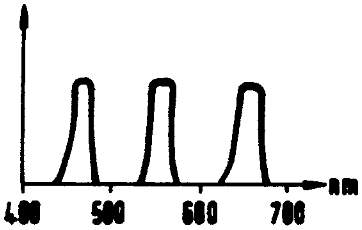
Figure 1D:
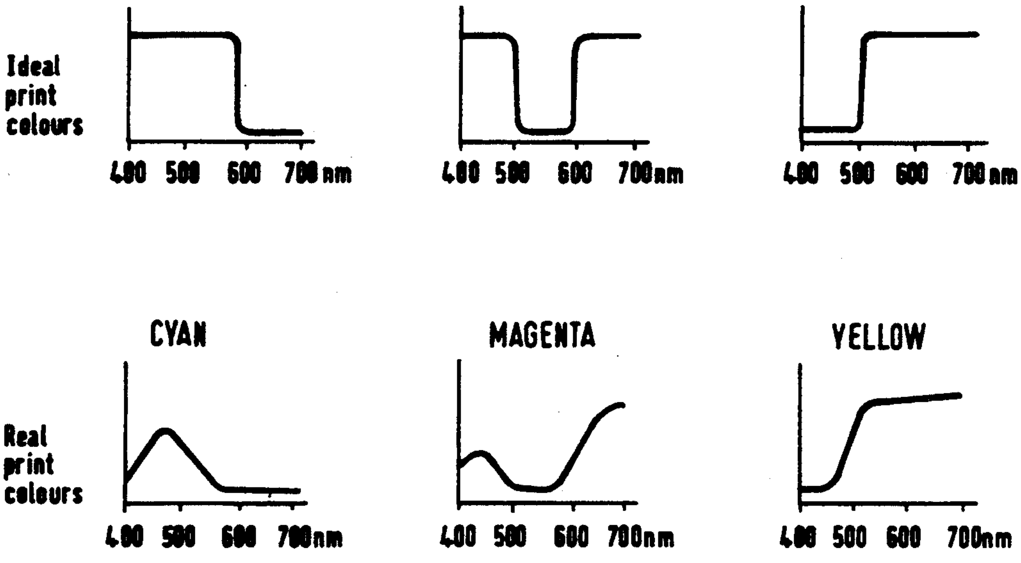

In one of the detections to be made here, the two different printing methods can be distinguished from each other by using the following criteria:

The dye stuffs used in a colour copying machine must necessarily be of another type than that which is used in a multilayer printing-process, since all spectral colours shall appear to the eye by mixing merely three colours, see FIG. 1*d*. The colours are "wide band", and narrow colours with bandwidth of about 50 nm cannot possibly by produced.

As previously mentioned, the dye stuffs in the copies are optimally adapted in order that the normal human eye may perceive the copy in the same manner as the original. This means that the colours in the green range are reproduced very well, while possible deviations in the blue and red colour ranges are not recorded particularly well, and nor are these deviations so essential to control completely in the copy which is produced.

Nor does the colour copying machine analyze the colours beyond the visible spectrum. One simple measurement of reflected light in e.g. the infrared range will also often be completely revealing.

Thus, it turns out that a colour copying machine is able to produce very good copies as seen by the eye, but when viewed by a spectrometer, it turns out that the copy will only show a good colour reproduction in the green range and possibly in one of the colours blue or red.

This is the fact to be used as a basis in one part of the colour test which is an essential part of the present invention.

In a copying machine the colours are, as previously mentioned, mixed by applying tiny and completely covering points consisting of each primary colour dye. This cannot give the same effect as a multilayer print process, namely the possibility of recognizing the single colour components in one or several of the dye layers.

That which in most cases distinguishes the copies from the bills with genuine print, lies in the content of blue and red in the colour mixtures which are of an extreme character. Colours containing a lot of blue and red in relation to green, will be copied poorly, as viewed with a spectrometer. In the same manner, colours containing only little blue and red, will be copied very poorly.

As mentioned previously, it is known, or it is supposed that the colour reproduction in the green central range is very good in the colour copy. Therefore, there is no reason to spend time and money analysing this. The green colour shall only be used as a reference in correcting for general colour variations, wear and impurities in the bank notes. The green colour is very well suited to this, because it is always copied very reliably. (As for the development of new colour copying machines, it is a sound guess to suppose that while these are continuously being improved, the feature which is actually improved will primarily be the colour reproduction in the most sensitive area of the human eye. For the method in accordance with the invention, this means that the improvement will only consist in a better reference colour for comparison and correction of the measurements of red and blue.)

The method according to the invention thus consists in finding one or several discrete points containing a combination which is difficult to copy, and then, using a very precise measuring technique, determining the colour reflecting characteristics of said point or points, that is colour reflecting characteristics in a broad sense (both reflection, scattering and in certain cases transmission will be included). It is quite essential here to measure the contents of both red, blue and green, and then combine the three measurement values in a favourable manner.

The reflecting qualities of the paper surface itself are also often revealing regarding the genuineness. The method in accordance with the present invention is also able to demonstrate deviations in the structure of the paper surface.

The method for analysing the colour reflecting characteristics in accordance with the present invention is also sufficiently rapid that the analysis can be undertaken in a bill sorting machine with a bill transport rate of as much as 5 m/s. The method requires only little or no computer capacity, so that the decision whether the bank note is genuine or not can be made while the note is in the measuring station in question in the transport track.

Figure 2A:
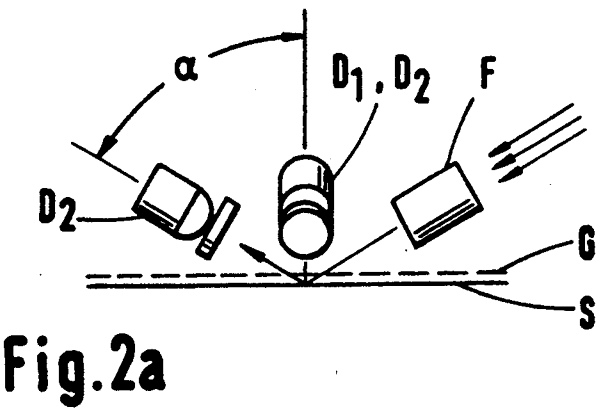
Figure 2B:
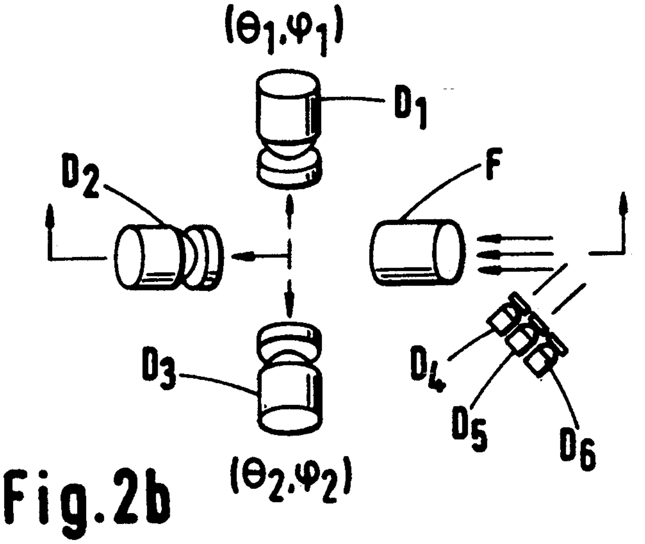
Figure 3:
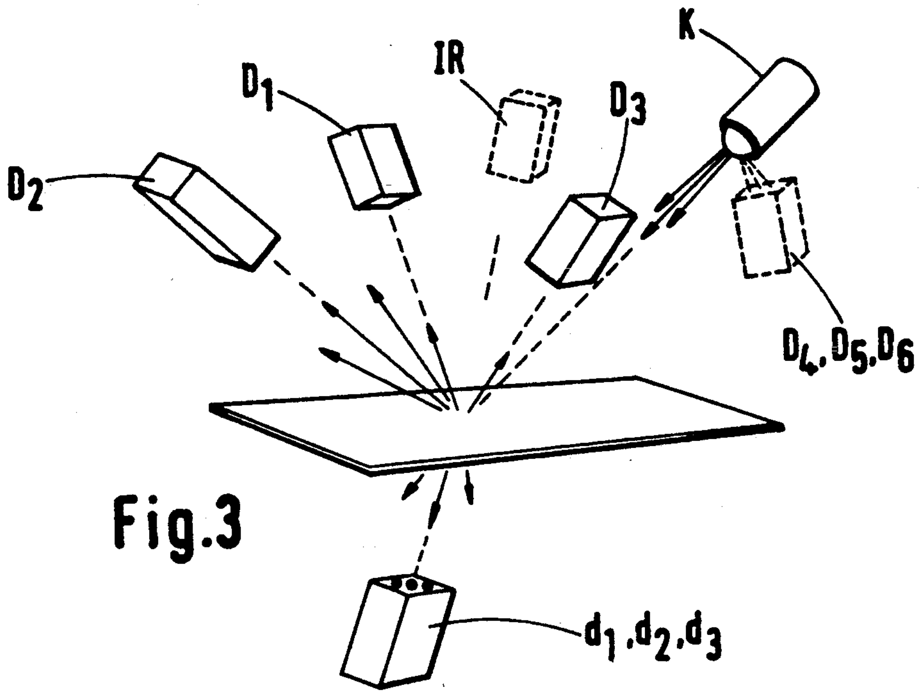

The invention shall now be described more closely with reference to non-limitative embodiment examples, and with reference to the enclosed drawings, where FIG. 1*a* shows an example of colour composition in a point on a bank note, FIG. 1*b* shows sensitivity curves of colour detectors in a typical modern colour copying machine, FIG. 1*c* shows an example of choice of filters for use in the analysis in accordance with the invention, FIG. 1*d* shows an example of typical printing dye colours used in a copying machine, FIG. 2*a* shows an apparatus embodiment of the optical detector in accordance with the invention, where only three reflected colours are measured, FIG. 2*b* shows the same arrangement as FIG. 2*a,* but viewed from another angle (from above), and FIG. 3 is a schematic view of an embodiment of the measuring system in accordance with the invention, with analysis of reflected light in four colour bands, analysis of transmitted light and measurement of the corresponding colour composition of the light source.

In FIG. 1*b* appears a typical sensitivity curve for the colour detectors in the analyser of a colour copying machine. It should be noted that the three curves respectively have a bandwidth of about 100 nm. It should also be noted that the three curves overlap with each other. This is quite necessary for an analyser which must be able to reproduce all colours.

FIG. 1*d* shows the spectra of typical print colours for a tree-coloured print process. It appears that "narrow" colour bands can be composed by using these dyes.

FIG. 1*a* shows a sketch of a spectrum from a bank note to be checked for genuineness, with relative intensity as a function of wavelength. A certain point has been chosen on the bank note, in which point there exists a colour combination which is difficult to handle for the copying machine. As appears from the curve shape, said point comprises rather much blue and red in relation to green. In FIG. 1*c* there is shown an example of a choice of colour filters to be used in front of each respective one of the possibly three detectors to be used in accordance with the invention. The three filters have one respective pass band in each respective of the three colour ranges in question, and the width of the three bands is about the same, in the example about 35 nm. Thus, the three bands do not overlap at all, and the pass bands should be as rectangular as possible, as shown in the figure. A detector system comprising filters of this type will not encounter difficulties in distinguishing between a good colour copy and a genuine bank note.

FIG. 2*a, b* show the optical detector system as viewed from two sides. The reference letters G and S represent respectively a glass plate and the paper note, and F is a focusing means. The three photodetectors D1, D2 and D3 are equipped with respective colour filters of the type just mentioned. Reference detectors D4, D5 and D6 are equipped with filters of the same types as D1–D3. D1–D3 "view towards" the same point on the bank note to be tested. D4–D6 view towards the same point on a white surface inside the light source K. Both the light source K and all detectors D1–D6 are positioned inside a housing (not shown in the drawings) which on its underside is provided with a glass window G. The bill advancing track is situated below said glass window. The glass window G prevents dust from entering the sensor housing. Preferably a black and non-reflecting surface, or alternatively a dark hole is located in the bill advancing track below the glass window. i.e. on the underside of the paper bill when the bill is in the measurement position.

For the sake of clarity, the terms "narrow blue", "narrow green" and "narrow red" will be used to characterize the three narrow filter bands of interest in this example, reference being made to visible colours and the selected and particular, narrow parts of the visible spectrum. However, the invention may also in its more general aspect comprise such narrow and significant bands also beyond the visible spectrum (especially parts of the infrared range are of interest). The same or corresponding terms will then be used to designate narrow detection bands in ordered succession according to wave length, and with non-overlapping positions, i.e. within respective wider wavelength ranges.

In the example, the locations of the filters are now defined precisely in such a manner that D1 and D4 are equipped with blue filter (i.e. narrow blue), D2 and D5 have green filter (i.e. narrow green), and D3 and D6 have red filter (i.e. narrow red) of the type shown in FIG. 1*c,* front mounted.

Diodes D4, D5, D6 are used to compensate for changes in the spectral distribution of the light source. There are several ways of making such a correction regarding the mathematical or signal processing aspect, and any known technique may be used (for example ratio or subtractive calculations). Thus, these diodes measure the same narrow blue, narrow green and narrow red wavelength bands as D1, D2 and D3. D2 sees directly reflected light in the plane of incidence of the light, in the reflection angle $\alpha$ (=the angle of incidence). D1 and D3 see diffusely scattered light in a polar coordinate direction ($\Theta$, $\Phi$) at the side of the plane of incidence. When these angles/directions are selected in a favourable manner, the detector will also reveal deviations in the reflecting qualities of the paper surface.

It will be possible to use the sensor means in accordance with the invention in a few different ways regarding zero correction, in dependence of the required precision. Firstly, it is of course possible to conduct the test procedure without any zero correction: When a paper note specimen enters the position below the Sensor, detectors D1, D2, and D3 will see a colour combination which is scaled according to a known mathematical formula. Thus, the sensor means delivers an output voltage representing the contents of respectively narrow red and narrow blue in the paper bill in the position in question. In principle this measurement method should be adequate, since changes in the colour balance of the lamp are taken care of in the correction via reference detectors D4. D5 and D6. However, it turns out that the stability achieved is a little weak (2% over a time period) regarding the purpose of the sensor, namely exposing counterfeit colour copies.

However, it is possible to use a zero correction on the basis of a measurement toward a known bright background: When no paper bill is present under the sensor, it is possible to make the sensor look at a white background. This background can be defined as a zero level, and all measurement data can be read as deviations from this value. This is the actual correction method of a few sensors already in the market, however it turns out that it is very difficult to maintain the reference surface in a condition of constant cleanness. Of course, a change in the reference implies a corresponding change in the measurement value.

However, a somewhat different correction method for the zero point is suggested here: When no paper bill is present under the sensor, the sensor is permitted to look toward a non-reflecting background. As an example this may be an empty space, or a black rubber roller of the type used for transporting the bills. It is to be noted that a black rubber roller which is soiled with printer's ink from the bills, still gives a quite insignificant light reflection. The light received by the detectors in a phase without a bank note under the sensor, is therefore only the reflected light from the glass window at the bottom. Thus, the glass is necessary if such a correction method is to be used. Ordinary glass will reflect about 10% of the light coming from the lamp. The detectors D1, D2 and D3 see this light, and this is used as a reference for the measurements. It turns out that such a method results in extremely stable measurements, even when the glass window is a little dusty or dirty on the outside.

With the last mentioned method, a double correction is undertaken in order to achieve adequate long term stability.

The light reflected from the glass plate can also be used to make an evaluation of whether the remaining burning time of the light source is still long, or if it will soon fail. It is favourable to be able to deliver a fault indication before the fault actually appears.

It is of course possible to study the colours of a bank note by means of light transmitted through the note instead of or in addition to the investigation of the reflected light, see FIG. 3. The sensor may then be arranged in such a manner that the light source beams directly into detectors d1, d2, d3 and with a possibility of passing the paper bills therebetween. Detectors d1, d2 and d3 are equipped with the same narrow filters as the remaining detector groups. It is then possible to study the transmission characteristics of the paper bills. Some of the stability details necessary for reflection measurements may then be left out, since the sensor of course is calibrated prior to leading the bill in between light source and detectors.

Of course it will be possible to use two sensor sets, where one set is a reflection sensor with the special points and characteristics as described above, while the other sensor is a relatively traditional transmission sensor. The genuineness analysis then aims at measuring a point on the bank note, or possibly a very limited number of points, both in a reflection mode and a transmission mode. Four measurement values are then obtained for every point, which measurement values are to be compared with the values of a genuine bill. According to experience the differences are quite noticeable.

FIG. 3 shows schematically a sensor which also looks at the transmission. A fourth sensor is indicated on the same side as the source, adapted for measurement of a fourth narrow colour, for example in the IR range.

Some practical experiments have been made with a sensor in accordance with the main aspect of the present invention. The experiment has been conducted with permission from and under control of a national bank. During the experiment, counterfeit bank notes were printed on genuine bank note paper, with a modern and good colour copying machine. The distributor of the colour copying machines undertook himself the adjustment of the colours etc., in order to achieve an optimum copying result. Visually the colour result of the copying was quite perfect. A colour sensor in accordance with the present invention was then put into use, analysing only reflected light. Besides, a measuring point on the bill was selected at random, and thus not a point of the extremum type as should be done in accordance with the invention. Still, it turned out to be a large difference between the counterfeit and the genuine bank notes, and the sensor was clearly able to sort out the counterfeit notes very rapidly.

In certain cases it may be impractical to enter into a quite fixed position on a bank note in order to undertake the analysis. If the sorting machine sorts different currency values, the sensor must be readjusted. However, the following alternative method has turned out to be very efficient:

The selected colour filters in the sensor are held constant, but it is important that the narrow green pass band lies close to the most sensitive range of the normal eye. In this colour genuine and counterfeit bank notes will namely exhibit the closest similarity. The two upper filters are according to experience most appropriately placed at 400–450 nm and 650–700 nm.

Instead of selecting a certain point in the paper bill transport, which will be the same point for all types of paper bills, a continuous measurement is made along a track over the bill while it passes the sensors. By means of very simple electronics the average intensity values are stored for respectively narrow red and narrow blue across the whole bill. In addition, the maximum value and the minimum value of respectively narrow red and narrow blue are stored continuously, of course as values which have been corrected against narrow green. This method gives an almost equally good result as if certain points were selected on the bills.

It is of course possible to run such an analysis simultaneously over two or several tracks/points and compare data from these multiple measurements, in order to achieve an increased reliability/better results.

In order to render the counterfeiting process even more difficult, it is possible to supplement the sensor, as mentioned above, with an analysis in a completely different colour band.

As an example, by measuring reflected or scattered infrared light (FIG. 3, IR detector) within a correspondingly narrow and significant band, an even better demonstration of deviations will be achieved. A favourable measuring range lies within the limits 1000 and 1100 nm. In printed areas where the copying machine permits the paper to shine only weakly through, this phenomenon will be very pronounced for most bank notes/forgeries. The copying machine makes no attempt to imitate the spectral content outside the visible range, because it has no dye stuffs or analysing method for doing so.

By conducting a simple analysis also outside the visible range, an improvement is achieved of the information to be used in making the final decision regarding genuine/fake print based upon several colour/optical characteristics.

Finally it should be noted that as an additional feature of the method in accordance with the invention, it is of course favourable to arrange for the genuine bank notes to be equipped with print areas with particularly characteristic or significant optical features, especially adapted to give noticable results when conducting an analysis of this type, i.e. (see FIG. 1*a*) particularly emphasizing those parts of the spectrum for which the copying machines are not optimized, in other words typical crests in red, blue and possibly an infrared range.

I claim:

1. A method for optical demonstration of different print qualities in bank notes or securities, including distinguishing between colour photocopy print and genuine multi-layer print, and in which method white light is emitted towards a note from a light source and reflected and scattered light is detected by a number of photodetectors and analyzed, each respective photodetector having a narrow band pass filter located in one of at least three separate spectral ranges, said narrow band pass filter having a band width of 20–40 nm, and measurements are made in at least one particularly selected area in the surface of the bank note, comprising the steps of:

simultaneously sensing with said photodetectors:

(a) directly reflected light in the plane of incidence of the light and in a reflection angle; and (b) diffusely scattered light in at least one direction far to at least one side of the plane of incidence; and adapting each said narrow band pass filter to the particular type of bank note to be investigated, from a knowledge of the optical characteristics of a genuine bank note.

2. A method in accordance with claim 1 wherein the pass filters of the photodetectors use half bands of which at least one is located beyond the visible optical spectral range.

3. A method in accordance with claim 1 wherein designations "narrow blue," "narrow green" and "narrow red" signify three of the at least narrow pass bands, respectively, wherein the spectral ranges comprise a larger range than the visible spectrum, and wherein the wavelength of the "narrow green" lies between the wavelengths of the "narrow red" and "narrow blue";

including adapting the pass filters with wavelength positions and bandwidths in dependence upon particular optical characteristics for said particularly selected area in the surface of the bank note and selecting said area on the basis of a determined maximum or minimum value over the surface of the bank note for the colour ratio narrow blue:narrow green or narrow red:narrow green.

4. A method in accordance with claim 3 wherein the demonstration is made along a narrow track over the full length or width of the bank note, said note passing the detector system which is conducting measurements continuously, recording and storing the average or total ratios narrow red:narrow green or narrow blue:narrow green for the complete bank note track, as well as a maximum and a minimum value of the same ratios.

5. A method in accordance with claim 3 including the step of employing a green filter with a pass band located at the maximum sensitivity range of the normal eye as the narrow green pass filter.

6. A method in accordance with claim 3 employing the detected narrow green colour as a reference for the measurements of narrow blue or narrow red.

7. A method in accordance with claim 3 including the step of making a transmission measurement using the same colour ranges and the same analysis technique, in addition to the reflection measurement.

8. A method in accordance with claim 3 wherein the genuine bank notes are printed with dye stuffs having characteristics adapted to optical signature differences between multi-layer and single-layer colour print in at least one particularly selected area on the bank note.

9. A method in accordance with claim 1 including the step of measuring intensity and colour composition corresponding to the three separate spectral ranges for the light source using reference detectors with narrow band pass filters having band widths corresponding to the band widths of said number of photodetectors, respectively, for correcting variations in the emission from the light source.

10. A method according to claim 1 including the step of making zero correction in a time period without a bank note in the detector field of view using said time period for recording light received from a glass window positioned between a test position of the bank note and the arrangement of said light source and said photodetectors for reflection and scattered light, said glass window being substantially parallel with a measurement plane of the bank note and being adapted to serve as a reference source for the photodetector measurements, in cooperation with a dark external background.

11. A method in accordance with claim 3 including the step of selecting said at least one of said directions in such a manner that said extreme value of colour ratio also takes an extreme value regarding a variation of said direction.

12. Apparatus for optical demonstration of different print qualities in bank notes or securities, including distinguishing between colour photocopy print and genuine multilayer print, comprising: a white light source for illuminating a bank note to be tested, a number of photodetectors for sensing reflected and scattered light from said bank note, means connected with said photodetectors for analyzing light received from said bank note, each respective photodetector having a narrow band pass filter located in one of at least three separat spectral ranges, said narrow band pass filter having a band width of 20–40 nm, said light source, additional optical means, and said photodetectors being adapted for measuring in at least one particularly selected area on the surface of the bank note, one of said photodetectors being adapted for measuring directly reflected light in a plane of incidence and in an angle of reflection for the light and at least another of said photodetectors being adapted for measuring diffusely scattered light in at least one direction far to at least one side of the plane of incidence of the light, said narrow band pass filters being selected from knowledge of the optical characteristics of a genuine, printed bank note.

13. Apparatus according to claim 12 including a glass window between the bank note to be tested and the arrangement of light source, additional optical means and photodetectors for excluding dust from said arrangement, said glass window serving as a reference source for the photodetector measurement, in cooperation with a dark external background.

14. Apparatus according to claim 12 wherein at least one of the pass filters of said photodetectors has a pass band outside the visible optical spectral range.

15. Apparatus according to claim 12 wherein the designations "narrow blue." "narrow green" and "narrow red" signify three of the at least three narrow pass bands, respectively, and wherein the spectral ranges comprise a larger range than the visible spectrum, and wherein the wavelength of the "narrow green" lies between the wavelengths of the "narrow red" and "narrow blue," said pass filters being adapted with a wavelength position and bandwidth in dependence upon particular optical characteristics for said particularly selected area on the surface of the bank note, said area being selected as a test area for said bank note on the basis of a determined extremum value, including a maximum or a minimum value over the bank note surface, for the colour ratio narrow blue:narrow green or narrow red:narrow green.

16. Apparatus according to claim 15 wherein said narrow green pass filter is a green filter with a pass band located at the maximum sensitivity range of the normal eye.

17. Apparatus according to claim 15 including further photodetectors, each further photodetector having a narrow band pass filter located in one of said three spectral ranges and having a band width of 20–40 nm, said further photodetectors being adapted for sensing light transmitted through said bank note.

18. Apparatus according to claim 12 including means for measuring intensity and colour composition for the light source corresponding to the colour relation for correcting for variations in the emission from said light source.

19. Apparatus according to claim 15 wherein said at least another photodetector for measuring diffusely scattered light is adapted so that said at least one direction is such that said extreme values of colour ratio assume extremum values regarding variation of said one direction.

* * * * *